United States Patent
Reuze et al.

(10) Patent No.: US 11,570,442 B2
(45) Date of Patent: Jan. 31, 2023

(54) REDUCING MOTION FIELD STORAGE FOR PREDICTION OF VIDEO DATA USING NON-RECTANGULAR PREDICTION MODES

(71) Applicant: QUALCOMM Incorporated, San Diego, CA (US)

(72) Inventors: Kevin Pascal Andre Reuze, Voisins le bretonneux (FR); Chun-Chi Chen, San Diego, CA (US); Wei-Jung Chien, San Diego, CA (US); Han Huang, San Diego, CA (US); Marta Karczewicz, San Diego, CA (US); Vadim Seregin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/893,052

(22) Filed: Jun. 4, 2020

(65) Prior Publication Data

US 2020/0389651 A1 Dec. 10, 2020

Related U.S. Application Data

(60) Provisional application No. 62/857,584, filed on Jun. 5, 2019, provisional application No. 62/861,811, filed on Jun. 14, 2019.

(51) Int. Cl.
*H04B 1/66* (2006.01)
*H04N 19/137* (2014.01)
(Continued)

(52) U.S. Cl.
CPC ......... *H04N 19/137* (2014.11); *H04N 19/105* (2014.11); *H04N 19/119* (2014.11);
(Continued)

(58) Field of Classification Search
CPC .... H04N 19/119; H04N 19/176; H04N 19/52; H04N 19/463; H04N 19/70;
(Continued)

(56) References Cited

U.S. PATENT DOCUMENTS

| 2013/0022119 A1* | 1/2013 | Chien | H04N 19/176 |
| | | | 375/E7.123 |
| 2015/0271515 A1* | 9/2015 | Pang | H04N 19/70 |
| | | | 375/240.16 |
| 2019/0335208 A1* | 10/2019 | Lim | H04N 19/103 |

FOREIGN PATENT DOCUMENTS

WO WO-2020185595 A1 * 9/2020 ........... H04N 19/105

OTHER PUBLICATIONS

Benjamin et al (Versatile Vidoe Coding (Draft 5), Joint Video Experts Team (JVET) 14th Meeting Geneva CH, Mar. 19-27, 2019) (Year: 2019).*

(Continued)

*Primary Examiner* — Masum Billah
(74) *Attorney, Agent, or Firm* — Shumaker & Sieffert, P.A.

(57) ABSTRACT

An example video coding device is configured to: code a first set of motion information for a current block of video data partitioned into a first partition and a second partition according to a non-rectangular partition mode, the first set of motion information referring to a reference picture list and being associated with the first partition; after coding the first set of motion information, code a second set of motion information for the current block referring to the reference picture list and that is associated with the second partition; in response to the first set of motion information and the second set of motion information both referring to the reference picture list, store the second set of motion information for the current block; and predict subsequent motion (Continued)

information of a subsequent block of the video data that neighbors the current block using the stored second set of motion information.

37 Claims, 11 Drawing Sheets

(51) Int. Cl.
  *H04N 19/119* (2014.01)
  *H04N 19/176* (2014.01)
  *H04N 19/132* (2014.01)
  *H04N 19/159* (2014.01)
  *H04N 19/105* (2014.01)

(52) U.S. Cl.
  CPC ......... *H04N 19/132* (2014.11); *H04N 19/159* (2014.11); *H04N 19/176* (2014.11)

(58) Field of Classification Search
  CPC .. H04N 19/103; H04N 19/105; H04N 19/132; H04N 19/137
  USPC ......................................................... 375/240
  See application file for complete search history.

(56) References Cited

OTHER PUBLICATIONS

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.
Bross, B. et al., "Versatile Video Coding (Draft 10)", JVET-S2001-vG, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 548 Pages.
Bross B. et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-V3, 371 pages.
Chen, F. et al., "Non-CE4: Simplification of MV Context Storage for Triangle Mode", JVET-O0378-v4, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.
Chen J., et al., "Algorithm Description for Versatile Video Coding and Test Model 5 (VTM 5)", 14th JVET Meeting; Mar. 19, 2019-Mar. 27, 2019; Geneva; (The Joint Video Exploration Team of ISO/IEC JTC1/SC29/WG11 and ITU-T SG.16), No. JVET-N1002-v1, May 21, 2019, XP030205194, Retrieved from the Internet: URL:http://phenix.int-evry.fr/jvet/doc_end_user/documents/14_Geneva/wg11/JVET-N1002-v1.zip JVET-N1002-v1.docx, 70 pages.
Hsiao, Y-L. et al., "CE4-related: Simplification of Motion Vector Storing Process for Triangle Prediction mode", JVET-O0279-v4, Joint Video Experts Team (JVET) of ITU-T SG 16 WP3 and ISO/IEC JTC 1/SC 29/WG 11, 15th Meeting, Gothenburg, SE, Jul. 3-12, 2019, pp. 1-6.
International Organisation for Standardisation, "Text of ISO/IEC 13818-1:2015/FDAM 2 Carriage of Layered HEVC," ISO/IEC JTC1/SC29/WG11 MPEG112/N15468, Warsaw, Poland, Jun. 2015, 24 Pages.
ITU-R Recommendation BT.2100-2, "Image parameter values for high dynamic range television for use in production and international programme exchange," Jul. 2018, 16 pages.
ITU-T H.265, "Series H: Audiovisual and Multimedia Systems, Infrastructure of Audiovisual Services—Coding of Moving Video, High Efficiency Video Coding," The International Telecommunication Union, Dec. 2016, 664 Pages.
ITU-T H.320: "Series H: Audiovisual and Multimedia Systems, Infrastructure of Audiovisual Services—Systems and Terminal Equipment for Audiovisual Services, Narrow-band Visual Telephone Systems and Terminal Equipment", International Telecommunication Union, Mar. 2004, 34 Pages.
Lee, H. et al., "Non-CE4: Simplification of Motion Vector Storage Process for Triangle Merge Mode", JVET-O0329-v3, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-11.
Liao (Panasonic) R L., et al., "CE10.3.1.b: Triangular Prediction Unit Mode", 12. JVET Meeting, Oct. 3, 2018-Oct. 12, 2018, MACAO, (The Joint Video Exploration Team of ISO/IEC JTC 1/SC 29/WG 11 and ITU-T SG.16), No. JVET-L0124-V2, Nov. 1, 2018 (Nov. 1, 2018), XP030198593, 8 Pages Retrieved from the Internet: URL: http://phenix.int-evry.fr/jvet/doc_end_user/documents/12_Macao/wg11/JVET-L0124-v6.zip JVET-L0124-v2.doc [retrieved on Nov. 1, 2018], the whole document.
Liao, R-L. et al., "Non-CE4: Simplification of Motion Field for Triangle Partition", JVET-O0629-v1, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-10.
Meng, X. et al., "CE4 related: Simplification of Motion Vector Storage Operation for Triangle Merge Mode", JVET-O0418-v3, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.
Park (Kau) D et al: "CE10-related: Simplification of Triangular Partitions", 13. JVET Meeting, Jan. 9, 2019-Jan. 18, 2019, Marrakech, (The Joint Video Exploration Team of ISO/IEC JTC1/SC29/WG11 and ITU-TSG.16), No. JVET-M0352, Jan. 12, 2019 (Jan. 12, 2019), 5 Pages XP030253630, Retrieved from the Internet: URL: http://phenix.int-evry.fr/jvet/doc_end_user/documents/13_Marrakech/wg11/JVET-M0352-v4.zip JVET-M0352_v3.docx, [retrieved on Jan. 12, 2019], Section 1, Section 2.
Partial International Search Report—PCT/US2020/036330—ISAEPO—dated Sep. 21, 2020 19 Pages.
Reuze, K. et al., "Non-CE4: Simplification of Bi-Prediction MV Generation for Triangle Partition Mode Storage", JVET-O0411-v2, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-5.
Reuze (Qualcomm) K., et al., "Non-CE4: Fix for Missing MV in 4xN and Nx4 Triangle Partition Mode", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0666, Jul. 9, 2019 (Jul. 9, 2019), 4 Pages XP030220205, Retrieved from the Internet: URL: http://phenix.int-evry.fr/jvet/doc_end_user/documents/15_Gothenburg/wg11/JVET-O0666-v5.zip JVET-O0666_v4.docx, [retrieved on Jul. 9, 2019], the whole document.
Reuze (Qualcomm) K., et al., "Non-CE4: Simplification of Hi-Prediction MV Generation for Triangle Partition Mode Storage", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0411, Jul. 1, 2019 (Jul. 1, 2019), 5 Pages XP030219498, Retrieved from the Internet: URL: http://phenix.int-evry.fr/jvet/doc_end_user/documents/15_Gothenburg/wg11/JVET-O0411-v3. zip JVET-O0411_v2.docx, [retrieved on Jul. 1, 2019], the whole document.
Zhang (Bytedance) L., et al., "CE10-Related: Merge List Construction Process for Triangular Prediction Mode", 13. JVET Meeting, Jan. 9, 2019-Jan. 18, 2019, Marrakech, (The Joint Video Exploration team of ISO/IEC JTC1/SC29/WG11 and ITU-TSG.16), No. JVET-M0271, Jan. 3, 2019 (Jan. 3, 2019), 4 Pages XP030252330, Retrieved from the Internet: URL: http://phenix.int-evry.fr/jvet/doc_end_user/documents/13_Marrakech/wg11/JVET-M0271-v1.zip JVET-M0271.docx, [retrieved on Jan. 3, 2019], Section 1, Section 2.
Zhang, N. et al., "Non-CE4: Simplified Motion Field Storage for TPM", JVET-O0265, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-4.

(56) References Cited

OTHER PUBLICATIONS

C-C Chen (Qualcomm)., et al., "Non-CE4/8: Blending-off Switch for TPM Mode", 15. JVET Meeting; Jul. 3, 2019-Jul. 17, 2019; Gothenburg; (The Joint Video Exploration Team of ISO/IEC JTC1/SC29/WG11 and ITU-T SG.16), No. JVET-O0645, Jul. 2, 2019 (Jul. 2, 2019), XP030220139, 3 pages, Retrieved from the Internet: URL: http://phenix.int-evry.fr/jvet/doc_end_user/documents/15_Gothenburg/wg11/JVET-O0645-v2.zip JVET-O0645-r1.docx [retrieved on Jul. 2, 2019].

C-C Chen (Qualcomm)., et al., "Non-CE4/8: Combination of Blending-off Switch (JVET-O0645) and Simplified Motion Storage (JVET-O0411) for TPM Mode", 15. JVET Meeting, Jul. 3, 2019-Jul. 12, 2019; Gothenburg; (The Joint Video Exploration Team of ISO/IEC JTC1/SC29/WG11 and ITU-T SG.16 ), No. JVET-O0646, Jul. 5, 2019 (Jul. 5, 2019), XP030220141, 6 pages, Retrieved from the Internet: URL: http://phenix.int-evry.fr/jvet/doc_end_user/documents/15_Gothenburg/wg11/JVET-O0646-v3.zip JVET-00646-r2.docx [retrieved on Jul. 5, 2019].

International Search Report and Written Opinion—PCT/US2020/036330—ISA/EPO—dated Nov. 10, 2020.

Sole J, et al., "AhG13: Palette and deblocking", 19. JCT-VC Meeting, Oct. 17, 2014-Oct. 24, 2014; Strasbourg; (Joint Collaborative Team on Video Coding of ISO/IEC JTC1/SC29/WG11 and ITU-T SG.16 ), URL: http://wftp3.itu.int/av-arch/jctvc-site/, No. JCTVC-S0096-v2, Oct. 15, 2014 (Oct. 15, 2014), XP030116842, 5 pages.

Zhang H., et al., "HEVC-based Adaptive Quantization for Screen Content by Detecting Low Contrast Edge Regions", Circuits and Systems (ISCAS), 2013 IEEE International Symposium ON, IEEE, May 19, 2013 (May 19, 2013, XP032445854), pp. 49-52, DOI: 10.1109/ISCAS.2013.6571779 ISBN: 978-1-4673-5760-9 Section IV.

\* cited by examiner

REDUCING MOTION FIELD STORAGE FOR PREDICTION OF VIDEO DATA USING NON-RECTANGULAR PREDICTION MODES

This application claims the benefit of U.S. Provisional Application No. 62/857,584, filed Jun. 5, 2019, and U.S. Provisional Application No. 62/861,811, filed Jun. 14, 2019, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video coding using inter-prediction. More particularly, during inter-prediction, a block of video data may be partitioned and predicted using a non-rectangular partition mode, such as Triangle Partition Mode (TPM) or other geometric partition modes. This disclosure describes techniques that may be used to simplify storage of data for non-rectangular partition modes, such as TPM. Thus, the techniques of this disclosure may reduce an amount of data stored during and after a video coding process, thereby improving storage of video data and bitrate for coded video data. Moreover, the techniques of this disclosure may be used to perform a non-rectangular partitioning of a block forming part of a uni-directional inter-prediction slice (i.e., a P-slice). That is, a video coder may disable a blending operation during non-rectangular partitioning, such as TPM, performed on a block of a P-slice, in addition to other techniques described in this disclosure.

In one example, a method of coding video data includes coding a first set of motion information for a current block of video data, the current block being partitioned into a first partition and a second partition according to a non-rectangular partition mode, the first set of motion information referring to a reference picture list and being associated with the first partition; after coding the first set of motion information, coding a second set of motion information for the current block, the second set of motion information referring to the reference picture list and being associated with the second partition; in response to the first set of motion information and the second set of motion information both referring to the reference picture list, storing the second set of motion information for the current block; and predicting subsequent motion information of a subsequent block of the video data that neighbors the current block using the stored second set of motion information.

In another example, a device for coding video data includes a memory configured to store video data; and one or more processors implemented in circuitry and configured to: code a first set of motion information for a current block of the video data, the current block being partitioned into a first partition and a second partition according to a non-rectangular partition mode, the first set of motion information referring to a reference picture list and being associated with the first partition; after coding the first set of motion information, code a second set of motion information for the current block, the second set of motion information referring to the reference picture list and being associated with the second partition; in response to the first set of motion information and the second set of motion information both referring to the reference picture list, store the second set of motion information for the current block in the memory; and predict subsequent motion information of a subsequent block of the video data that neighbors the current block using the stored second set of motion information.

In another example, a computer-readable storage medium has stored thereon instructions that, when executed, cause a processor to code a first set of motion information for a current block of video data, the current block being partitioned into a first partition and a second partition according to a non-rectangular partition mode, the first set of motion information referring to a reference picture list and being associated with the first partition; after coding the first set of motion information, code a second set of motion information for the current block, the second set of motion information referring to the reference picture list and being associated with the second partition; in response to the first set of motion information and the second set of motion information both referring to the reference picture list, store the second set of motion information for the current block; and predict subsequent motion information of a subsequent block of the video data that neighbors the current block using the stored second set of motion information.

In another example, a device for coding video data includes means for coding a first set of motion information for a current block of video data, the current block being partitioned into a first partition and a second partition according to a non-rectangular partition mode, the first set of motion information referring to a reference picture list and being associated with the first partition; means for coding a second set of motion information for the current block after coding the first set of motion information, the second set of motion information referring to the reference picture list and being associated with the second partition; means for storing the second set of motion information for the current block in response to the first set of motion information and the second set of motion information both referring to the reference picture list; and means for predicting subsequent motion information of a subsequent block of the video data that neighbors the current block using the stored second set of motion information.

The details of one or more examples are set forth in the accompanying drawings and the description below. Other features, objects, and advantages will be apparent from the description, drawings, and claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010. In addition, there is a newly developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from phenix.int-evry.fr/jct/doc end user/documents/12 Geneva/wg11/JCTVC-L1003-v34.zip.

Moreover, an upcoming video coding standard in development is described in Bross et al. "Versatile Video Coding (Draft 5)," Joint Video Experts Team (JVET) of ITU-T SG 16 WP 3 and ISO/IEC JTC 1/SC 29/WG 11, 14th Meeting: Geneva, CH, 19-27 Mar. 2019, JVET-N1001-v3 (hereinafter "VVC Draft 5"). VVC and Test Model 4 (VTM 4) are described in Chen et al., "Algorithm description for Versatile Video Coding and Test Model 5 (VTM 5)," document JVET-N1002, May 21, 2019.

Video coding devices (e.g., video encoders and video decoders) implement compression technologies to, e.g., perform spatial and temporal prediction to reduce or remove the redundancy inherent in input video signals. In order to reduce temporal redundancy (that is, similarities between video signals in neighboring frames), motion estimation is carried out to track the movement of video objects. Motion estimation may be done on blocks of variable sizes. The object displacement as the outcome of motion estimation is commonly known as a motion vector. Motion vectors may have half-pixel, quarter-pixel, 1/16th-pixel precisions (or any finer precisions). This allows the video coder to track a motion field in higher precision than integer-pixel locations and, hence, obtain a better prediction block. When motion vectors with fractional pixel values are used, interpolation operations are carried out.

After motion estimation, a video encoder may determine the best performing motion vector using a certain rate-distortion model. Then, the video encoder may form a prediction video block by motion compensation using the best motion vector. The video encoder may form a residual video block by subtracting the prediction video block from the original video block. The video encoder may then apply a transform to the residual block. The video encoder may then quantize resulting transform coefficients and entropy-encode the quantized transform coefficients (and other video data, e.g., motion information defining the motion vectors) to further reduce bit rate.

Figure 1:
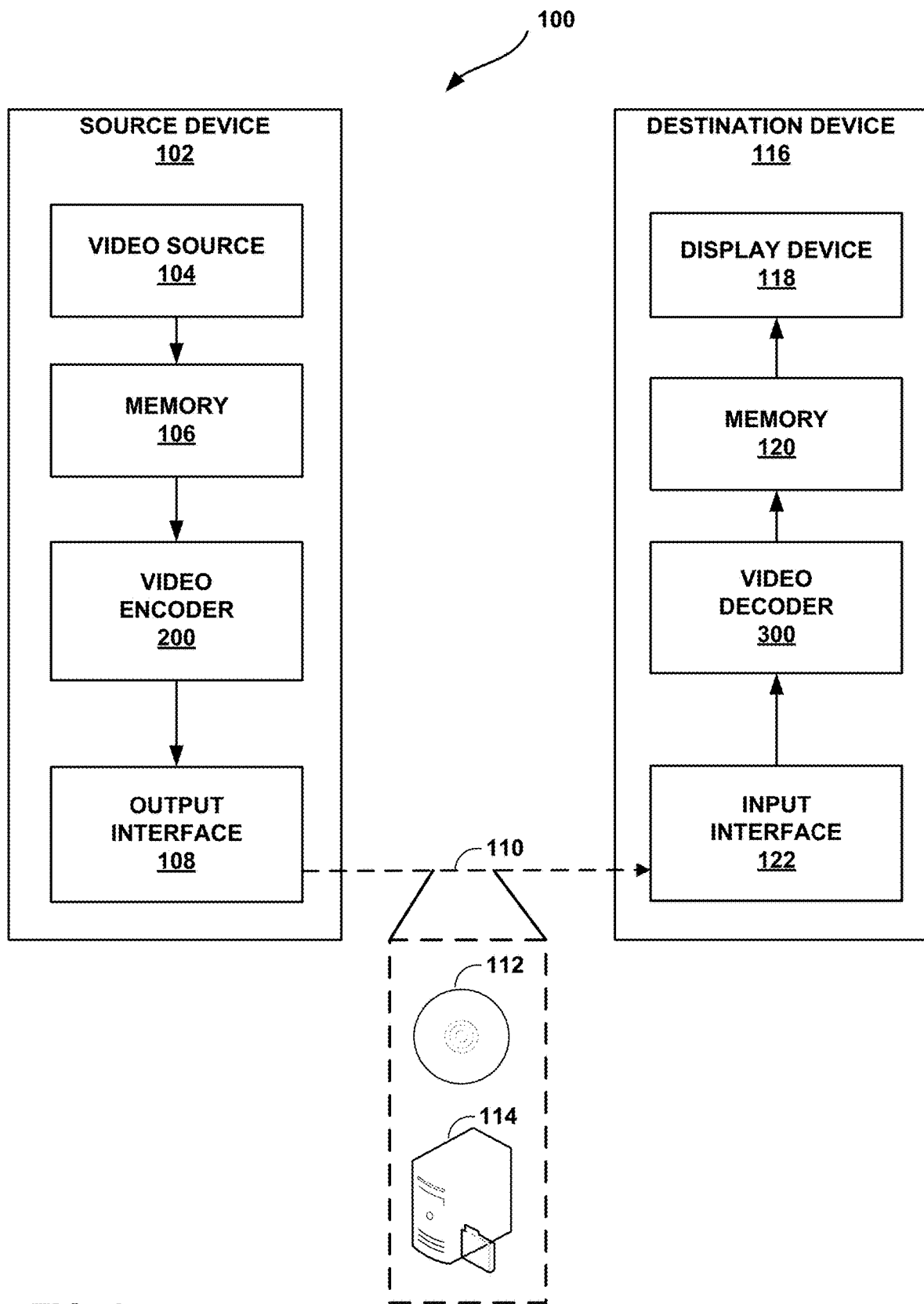
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for reducing motion field storage for prediction using triangle partition mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for reducing motion field storage for prediction using triangle partition mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

In inter-prediction modes, video encoder 200 and video decoder 300 may further code motion vectors used to predict blocks of video data. For example, in merge mode, video encoder 200 and video decoder 300 may identify a motion vector of a neighboring block to a current block to be used to predict the current block. As another example, in advanced motion vector prediction (AMVP), video encoder 200 and video decoder 300 may identify a motion vector predictor of a neighboring block, and then code data representing motion vector differences relative to the motion vector predictor, as well as other motion information, such as a reference picture list and reference picture index.

In general, merge mode and AMVP mode are used to predict motion information for rectangular blocks of video data. In general, the motion information for such a rectangular block is the same for the entire block. However, in some instances, a block may be partitioned using a non-rectangular partition mode, such as triangle partition mode (TPM). In such non-rectangular (also referred to as geometric) partition modes, a block may be partitioned into two distinct partitions, each of which may have its own motion information. AMVP and merge modes for coding motion information are generally premised upon the assumption that a neighboring block will only have one set of uniform motion information. However, in non-rectangular partition modes, a neighboring block may have two distinct sets of motion information (one for each partition). In order to use the motion information of such a block as a reference for coding motion information of a subsequent block, video encoder 200 and video decoder 300 determine which set of motion information to store for later reference.

In accordance with the techniques of this disclosure, video encoder 200 and video decoder 300 may partition a block into a first partition and a second partition using a non-rectangular partition mode, such as TPM. In general, the first partition may be considered to be the partition having a greater number of samples along a top edge of the current block and the second partition may be considered to be the partition having a greater number of samples along a bottom edge of the current block. Thus, the first partition may be considered to be above the second partition in the current block. Video encoder 200 and video decoder 300 may code motion information for the first partition (i.e., the above partition) before coding motion information for the second partition. Likewise, a bitstream including video data may include encoded motion information for the first partition before encoded motion information for the second partition.

According to the techniques of this disclosure, when a block is partitioned into a first partition and a second partition as discussed above, and when the motion information for the first partition and the motion information for the second partition refer to the same reference picture list, video encoder 200 and video decoder 300 may store only the motion information for the second partition as use for reference when coding motion information of a subsequent block to the current block. For example, video encoder 200 may store the motion information for the second partition in memory 106, while video decoder 300 may store the motion information for the second partition in memory 120. Alternatively, video encoder 200 and video decoder 300 may store the motion information for the second partition in a memory (not shown in FIG. 1) of video encoder 200 and video decoder 300 themselves.

Thus, when coding the subsequent block, video encoder 200 and video decoder 300 may construct a motion vector predictor candidate list for the subsequent block, which may include the motion information of the second partition (i.e., the below partition) of the previous block (referred to above as the current block), and not the motion information of the first partition. Moreover, video encoder 200 and video decoder 300 may code motion information of the subsequent block using the stored motion information for the second partition of the previous block. The subsequent block can be a single block partition or can be partitioned using a non-rectangular partition mode, such as TPM.

By storing motion information for the second partition, but not for the first partition, video encoder 200 and video decoder 300 may continue to perform otherwise conventional merge mode or AMVP mode when coding subsequent motion information. Thus, techniques for constructing and using motion vector prediction candidate lists can remain the same, thereby preventing rework of other structures of video encoder 200 and video decoder 300. Furthermore, additional memory space need not be allocated to account for blocks coded using non-rectangular partition modes, such as TPM, to store both sets of motion information for partitions of the blocks. Thus, these techniques may allow efficient implementation of non-rectangular partition modes.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
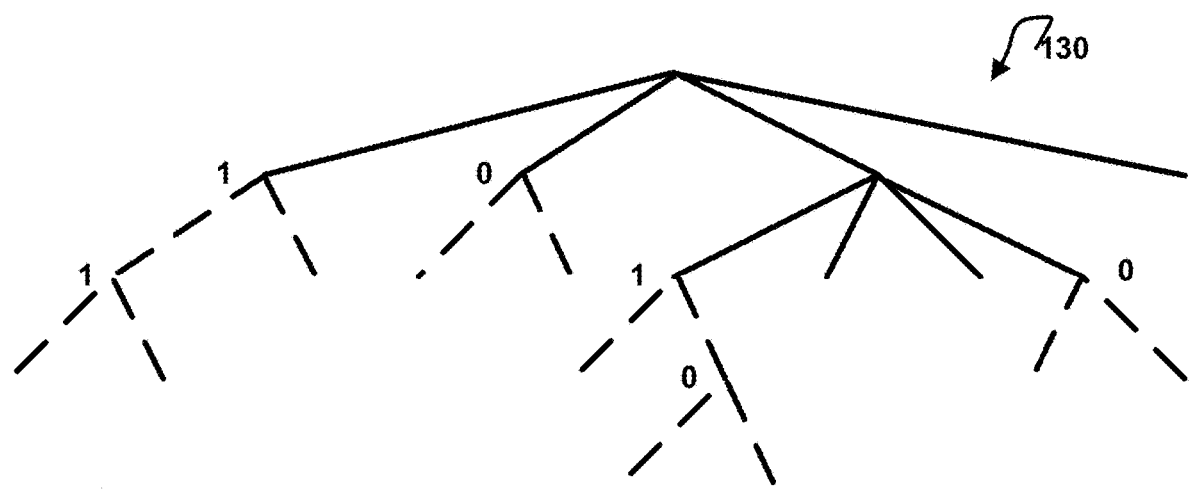
FIGS. 2A and 2B are conceptual diagrams illustrating an example quadtree binary tree (QTBT) structure, and a corresponding coding tree unit (CTU).
Figure 2B:
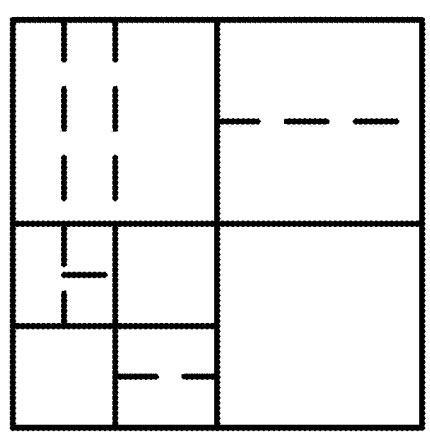

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
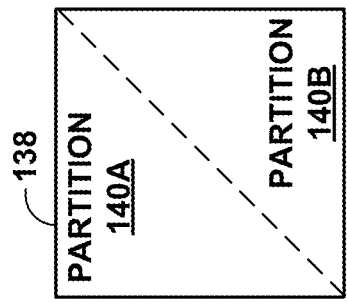
FIG. 3 is a block diagram illustrating examples of blocks partitioned using triangle partition mode (TPM).
Figure 3:
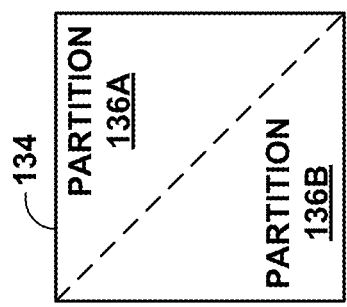

FIG. 3 is a block diagram illustrating examples of blocks partitioned using triangle partition mode (TPM). In the example of FIG. 3, block 134 is partitioned along the left-to-right diagonal into partitions 136A, 136B, and block 138 is partitioned along the right-to-left diagonal into partitions 140A, 140B. In these examples, partition 136A may be considered to be above partition 136B, while partition 140A may be considered to be above partition 140B. That is, partition 136A has more samples along an upper edge of block 134 than partition 136B, while partition 140A has more samples along an upper edge of block 138 than partition 140B. Therefore, for block 134, video encoder 200 and video decoder 300 may code motion information for partition 136A before motion information for partition 136B, and for block 138, video encoder 200 and video decoder 300 may code motion information for partition 140A before motion information for partition 140B.

Likewise, according to the techniques of this disclosure, if motion information for both partition 136A and partition 136B reference the same reference picture list, video encoder 200 and video decoder 300 may store the motion information for partition 136B as reference motion information for block 134 when coding motion information of a subsequent block to block 134. Similarly, if motion information for both partition 140A and partition 140B reference the same reference picture list, video encoder 200 and video decoder 300 may store motion information for partition 140B as reference motion information for block 138 when coding motion information of a subsequent block to block 138.

As introduced in JVET-N1002, the triangle partition mode may be applied to CUs coded in skip or merge mode, but not in merge mode with motion vector difference (MMVD) or combined inter and intra prediction (CIIP) modes. For a CU satisfying those conditions, video encoder 200 may encode and video decoder 300 may decode a flag indicating whether the triangle partition mode is applied or not.

When triangle partition mode (TPM) is used, a video coder may split a CU evenly into two triangle shaped partitions, using either the left-to-right diagonal split (which may be referred to as "the diagonal split") per block 134 or the right-to-left diagonal split (which may be referred to as the "anti-diagonal split") per block 138. Video encoder 200 and video decoder 300 may inter-predict each triangle partition (e.g., partitions 136A, 136B, 140A, 140B) using its own motion information. Per JVET-N1002, only uni-prediction is allowed for each partition. That is, in JVET-N1002, each partition has one motion vector and one reference index. The uni-prediction motion constraint is applied to ensure that, same as the conventional bi-prediction, only two motion compensated predictions are needed for each CU.

Video encoder 200 and video decoder 300 may derive uni-prediction motion for each partition from a uni-prediction candidate list constructed using the uni-prediction candidate list construction process described below.

A CU-level flag may indicate whether a current CU is coded using the triangle partition mode. If triangle partition mode is used, then video encoder 200 and video decoder 300 may further code a flag indicating the direction of the triangle partition (diagonal or anti-diagonal), and two merge indices (one for each partition). After predicting each of the triangle partitions, video encoder 200 and video decoder 300 may adjust sample values along the diagonal or anti-diagonal edge using a blending process with adaptive weights. The resulting blended prediction samples represent the prediction signal (that is, the prediction block) for the whole CU, and video encoder 200 and video decoder 300 may apply the transform and quantization processes to the whole CU as in other prediction modes. Finally, according to JVET-N1002, the motion field of a CU predicted using the triangle partition mode is stored in 4×4 units as in the blending along triangle partition edge techniques discussed below.

TPM is one example of a non-rectangular partitioning mode, or geometric partitioning mode. Other non-rectangular/geometric partitioning modes include, for example, partitioning a block using a multi-segmented line, which may be pre-defined or defined in coded data for the block. As another example of a geometric partitioning mode, a single line may be used to partition a block, where the line need not necessarily touch both of two opposite corners of the block, e.g., as described in U.S. Pat. No. 9,020,030, issued Apr. 28, 2015. The line may be defined using slope and intercept values, or two points representing the start and end points of the line with respect to the block.

Figure 4:
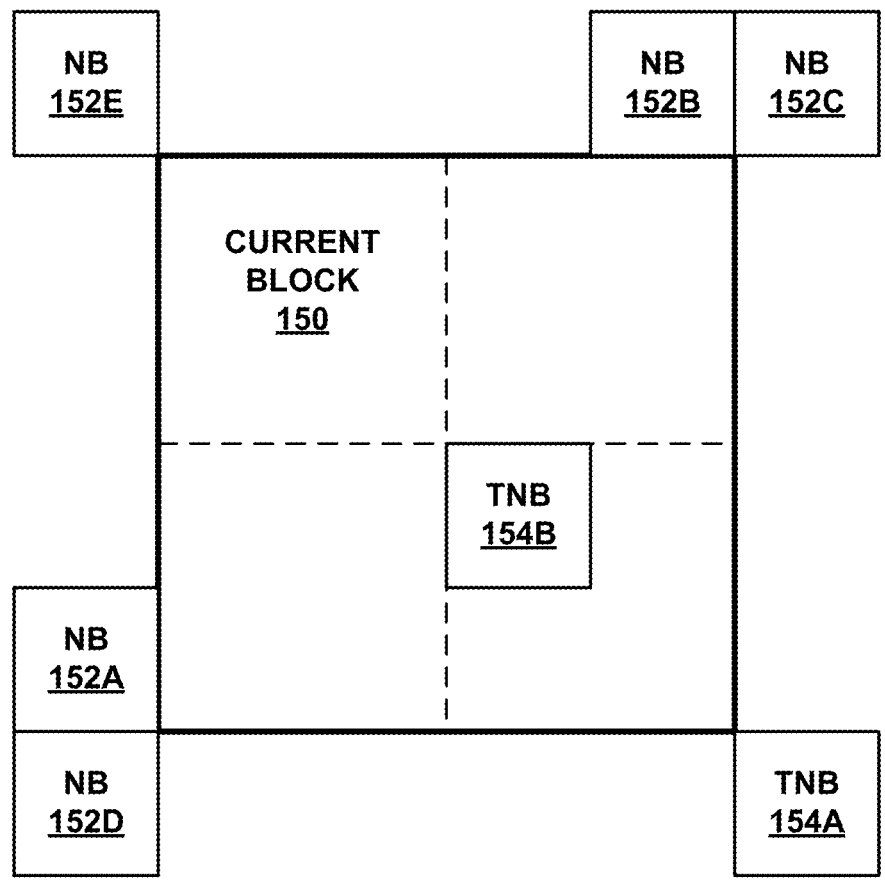
FIG. 4 is a block diagram illustrating spatial and temporal neighboring blocks used to construct a motion prediction candidate list.

FIG. 4 is a block diagram illustrating spatial and temporal neighboring blocks used to construct a motion prediction candidate list. FIG. 4 illustrates current block 150, which includes five spatial neighboring blocks (NBs) 152A-152E and two temporal neighboring blocks (TNBs) 154A, 154B.

A uni-prediction candidate list includes five uni-prediction motion vector candidates. Video encoder 200 and video decoder 300 may derive the uni-prediction candidate list from seven neighboring blocks, including five spatial neighboring blocks (labeled NB 152A-152E in FIG. 4) and two temporal co-located blocks (labeled TNB 154A, 154B in FIG. 4). Video encoder 200 and video decoder 300 may collect motion vectors of the seven neighboring blocks and put the motion vectors into the uni-prediction candidate list according to the following order: first, the motion vectors of the uni-predicted neighboring blocks; then, for the bi-predicted neighboring blocks, the list zero (L0) motion vectors (that is, the L0 motion vector part of the bi-prediction MV), the list one (L1) motion vectors (that is, the L1 motion vector part of the bi-prediction MV), and averaged motion vectors of the L0 and L1 motion vectors of the bi-prediction MVs. If the number of candidates is less than five, a zero motion vector may be added to the end of the list.

Video encoder 200 and video decoder 300 may further infer motion for TPM from a merge candidate list, e.g., a uni-prediction candidate list as discussed above. Table 1 below represents example motion information used for TPM as discussed below:

TABLE 1

| MERGE INDEX | L0 MV | L1 MV |
|---|---|---|
| 0 | X | |
| 1 | | X |
| 2 | X | |
| 3 | | X |
| 4 | X | |

Given a merge candidate index, video encoder 200 and video decoder 300 may derive the uni-prediction motion vector for a triangle partition from the merge candidate list. For a candidate in the merge list, its LX MV (with X equal to the parity of the merge candidate index value) may be used as the uni-prediction motion vector for triangle partition mode. These motion vectors are marked with "x" in Table 1. In case a corresponding LX motion vector does not exist, the L(1−X) motion vector of the same candidate in the extended merge prediction candidate list may be used as the uni-prediction motion vector for triangle partition mode. For example, supposing the merge list is composed of 5 sets of bi-prediction motions, the TPM candidate list may be composed of, from the first to the last, L0/L1/L0/L1/L0 MV of 0th/1st/2nd/3rd/4th merge candidate. Then the TPM mode requires signals for two different merge indices, one for a triangle partition, to indicate the use of candidates in the TPM candidate list.

Figure 5:
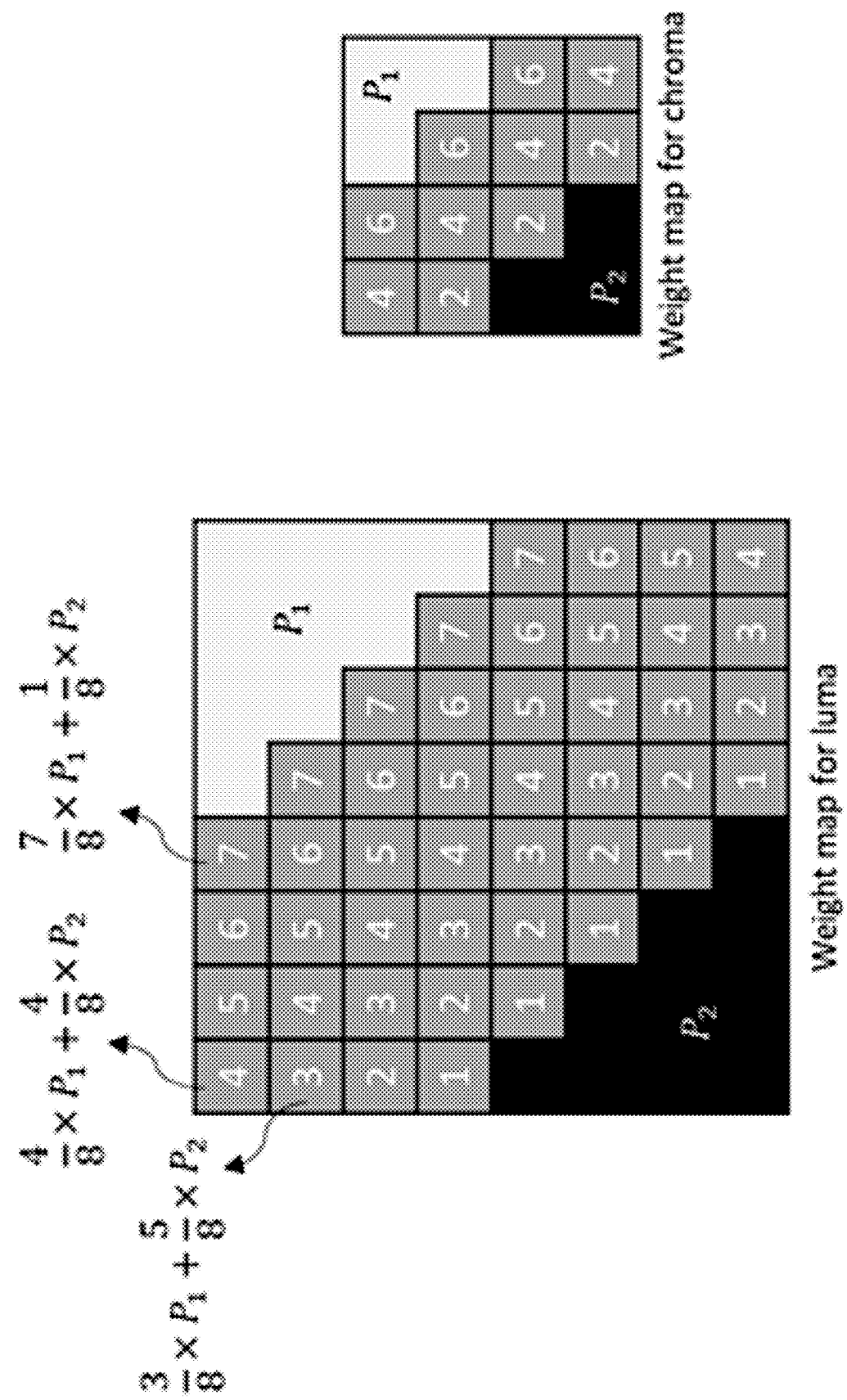
FIG. 5 is a block diagram illustrating example weights that may be used in a blending process for TPM.

FIG. 5 is a block diagram illustrating example weights that may be used in a blending process for TPM. After predicting each triangle partition using its own motion, video encoder 200 and video decoder 300 may apply blending to the two prediction signals to derive samples around the diagonal or anti-diagonal edge. FIG. 5 shows example weights used in the blending process.

In JVET-N1002, the motion vectors of a CU coded in triangle partition mode are stored in 4×4 units. Depending on the position of each 4×4 unit, either uni-prediction or bi-prediction motion vectors are stored. Denote Mv1 and Mv2 as uni-prediction motion vectors for partition 1 and partition 2, respectively. (It is noted that partitions 1 and 2 are the triangle blocks sitting respectively on the upper-right corner and lower-left corner when CUs are partitioned from top-left to lower-right (that is 45° split, i.e., a diagonal split), while they become triangle blocks sitting respectively on the upper-left corner and lower-right corner when CUs are partitioned from top-right to lower-left (that is 135° split, i.e., an anti-diagonal split)). If a 4×4 unit is located in the non-weighted area shown in the example of FIG. 5, either Mv1 or Mv2 is stored for that 4×4 unit. Otherwise, if the 4×4 unit is located in the weighted area, a bi-prediction motion vector is stored. The bi-prediction motion vector may be derived from Mv1 and Mv2 according to the following process of JVET-N1002:

1) If Mv1 and Mv2 are from different reference picture lists (one from L0 and the other from L1), then My' and Mv2 are simply combined to form the bi-prediction motion vector.
2) Otherwise, if Mv1 and Mv2 are from the same list, and without loss of generality, assume they are both from L0. In this case,
   a. If the reference picture of either Mv2 (or Mv1) appears in L1, then that Mv2 (or Mv1) is converted to a L1 motion vector using that reference picture in L1. Then the two motion vectors are combined to form the bi-prediction motion vector;
   b. Otherwise, instead of bi-prediction motion, only uni-prediction motion Mv1 is stored.

This disclosure recognizes that according to the process described in JVET-N1002, the current triangle motion compensation (MC), that is, triangle partition mode, does not use motion information from the motion buffer, which is contrary to all other prediction modes and is not good for a hardware implementation. This disclosure describes techniques by which the TPM process described in JVET-N1002 may be modified so that triangle MC can be performed by only using motion information in the motion buffer.

Furthermore, this disclosure recognizes that the current motion storage design for triangle MC of JVET-N1002 leads to a corner case (in 4×N/N×4 blocks) that does not have both motion compensation for partition 0 and partition 1. That is, the corner case may be defined as a block having a size that satisfies a threshold, e.g., being 4×N or N×4 (N being a positive integer value). This disclosure further recognizes that the generation of the bi-predicted motion vector to store in the blending area of triangle partition described in JVET-N1002 is complex. This is especially true of step 2 discussed above, where both motion vectors are from the same reference picture list and one of them is mapped to the other list. This disclosure describes techniques for simplifying this process. For example, in the corner case, a video coder may store a set of motion information for a below partition of a current block when motion information for both the below partition and an above partition of the current block refer to the same reference picture list.

The techniques of this disclosure may be used to remove bi-prediction motion vectors for storage. That is, rather than storing bi-prediction motion vectors, video encoder 200 and video decoder 300 may be configured to store only uni-prediction motion vectors for triangle partition mode. Video encoder 200 and video decoder 300 may be configured according to any of the various examples discussed below, alone or in any combination:
  In some examples, the storage of the bi-prediction motion vector is removed entirely, to only store the motion vector Mv1, as in P1.
  In some examples, the storage of the bi-prediction motion vector is removed entirely, to only store the motion vector Mv2, as in P2.
  In some examples, the storage of the bi-prediction motion vector is removed entirely, to store either Mv1 or Mv2, depending on the position inside the block (e.g., blocks in the upper half store Mv1 and blocks in the lower half store Mv2).
  In some examples, the storage of the bi-prediction motion vector is removed entirely, to store either Mv1 or Mv2, depending on the split direction of the triangle (e.g., Mv1 is stored for 45° split and Mv2 is stored for 135° split).
  In some examples, the bi-prediction motion vector is removed depending on block size (e.g., only for the corner cases of 4×N and N×4 blocks).
  In some examples, the bi-prediction motion vector is removed depending on block size and the position within the block (e.g., only for the corner case of 4×N and N×4, and for the first and last PUs).

Video encoder 200 and video decoder 300 may also be configured with a modified algorithm for generating the bi-prediction motion vector, which may simplify the process of generating the bi-prediction motion vector. Video encoder 200 and video decoder 300 may be configured according to any of the various examples discussed below, alone or in any combination:
  In some examples, when both Mv1 and Mv2 are from the same list, only Mv1 is stored.
  In some examples, when both Mv1 and Mv2 are from the same list, only Mv2 is stored.
  In some examples, when both Mv1 and Mv2 are from the same list, either Mv1 or Mv2 is stored, depending on the position within the block (e.g. blocks in the upper half store Mv1 and blocks in the lower half store Mv2).
  In some examples, when both Mv1 and Mv2 are from the same list, either Mv1 or Mv2 is stored, depending on the split direction of the triangle (e.g. Mv1 is stored for 45° (diagonal) split and Mv2 is stored for 135° (anti-diagonal) split).
  In some examples, when bi-prediction merge candidates in the merge list have non-0.5 BCW weight values, video encoder 200 and video decoder 300 do not use motion information corresponding to the reference picture list coupled with a lower weight value as a valid TPM candidate. Specifically, the motion information corresponding to a reference picture list Lx (where x is either 0 or 1) of a bi-prediction merge candidate may be included in the TPM candidate list when the following conditions are satisfied:
    If the bi-prediction merge candidate has a 0.5 BCW weight value, x is determined by the parity check process (i.e., same as the TPM candidate list construction process discussed above).
    Otherwise, if the bi-prediction merge candidate has a non-0.5 BCW weight value, x is determined by whichever list is assigned a larger BCW weight value.

Video encoder 200 and video decoder 300 may code a sequence-, picture-, tile-group-, slice-, and/or CTU-level flag in the bitstream that indicates the usage of the aforementioned technique for selecting valid TPM candidates.

Furthermore, this disclosure recognizes that triangle partition mode is not allowed in P-slices (that is, uni-directional inter-prediction slices). This is for two reasons. First, the blending process discussed above (e.g., with respect to FIG. 5) makes use of two motion vectors. However, in P-slices, only one motion vector is available, because bi-prediction is not enabled nor permitted for P-slices. Second, motion field storage can store bi-motion vectors (e.g., motion vectors from List 0 and List 1), which are not allowed in P-slices.

Video encoder 200 and video decoder 300 may be configured to enable non-rectangular partition modes, such as triangle partition mode, for blocks (e.g., coding units (CUs)) of P-slices. In particular, using the techniques for simplifying motion vector storage of triangle partition mode described above (and also described in U.S. Provisional Application No. 62/857,584, filed Jun. 5, 2019) to only store uni-motion vectors, and by disabling the blending operation of bi-motion vector triangle partition mode, triangle partition mode can be performed for blocks of P-slices. That is, video encoder 200 and video decoder 300 may be configured to predict a block of a P-slice using triangle partition mode by performing the techniques discussed above for simplifying motion vector storage and by disabling the blending operation.

Figure 6:
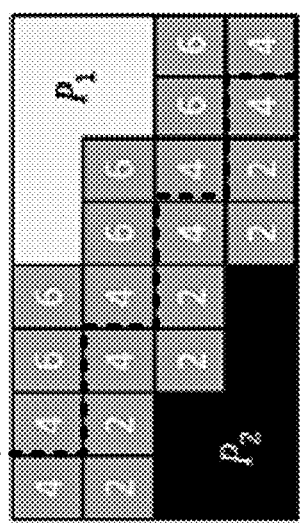
FIG. 6 is a block diagram illustrating example weights that may be used in a blending process for a TPM-predicted block having a stride width equal to two samples.
Figure 6:
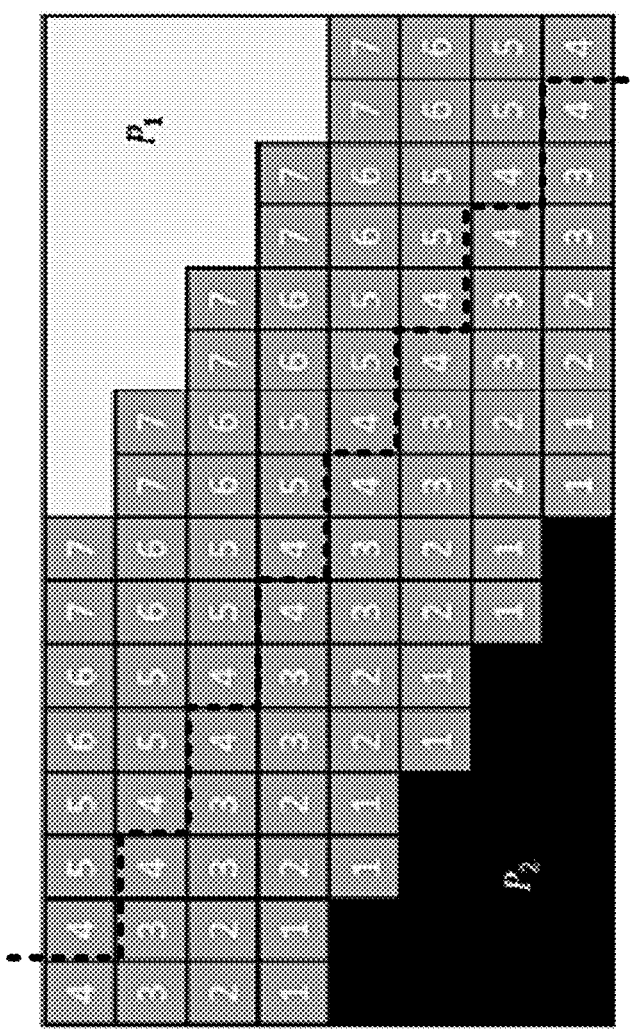

FIG. 6 is a block diagram illustrating example weights that may be used in a blending process for a TPM-predicted block having a stride width equal to two samples. Video encoder 200 and video decoder 300 may disable the blending operation applied to 4×4 units along a boundary between two triangle blocks in a CU, according to the techniques of this disclosure. When the blending operation is indicated to be disabled, video encoder 200 and video decoder 300 may apply any or all of the following techniques. No matter which technique is applied, the weighting values assigned to each respective sample on P2 may be set to be equal to 1 minus the weighting values assigned to the corresponding samples on P1.

In some examples, when blending samples from partitions P1 and P2, the video encoder 200 and video decoder 300 may reset weighting values assigned to each respective sample on P1 to be equal to:
(#a) 8/8 if they are larger than 4/8,
(#b) 4/8 if they are equal to 4/8, or
(#c) 0/8 if they are smaller than 4/8.

In some examples, the configuration of #b (that is 4/8) is replaced by 8/8.

In some examples, the configuration of #b (that is 4/8) is replaced by 0/8.

In some examples, the configuration of #b (that is 4/8) is replaced by either 0/8 or 8/8, depending on the split direction of the triangle (e.g. 8/8 if 45° split; 0/8 if 135° split).

In some examples, when the width of the stride with 4/8 weight as in #b is larger than 1 sample (e.g., the stride width being equal to N samples if the width-to-height ratio is N or 1/N, where N=2, 4, 8, . . . ), samples on one half of the stride are assigned with a weighting value equal to 8/8 if they are spatially closer to P1's corner while samples on the other half are assigned with 0/8. For example, FIG. 6 shows that the weighting values assigned to each respective sample on P1 are reset to be equal to 8/8 if these samples sit on the corner closer to P1, and the rest are assigned with 0/8.

Video encoder 200 and video decoder 300 may code a sequence-, picture-, tile-group-, slice-, and/or CTU-level flag in the bitstream that indicates whether these simplified blending techniques are enabled or disabled.

In some examples, video encoder 200 and video decoder 300 may disable motion vectors pointing to fractional pixel (pel) locations. Video encoder 200 and video decoder 300 may code a sequence-, tile-group-, slice-, and/or CTU-level flag in the bitstream that indicates the usage of the aforementioned technique for enabling or disabling fractional-pel motion vectors. When this new flag is enabled, all the motion vectors should be of integer precision and, thus, the fractional interpolation which blends sharp prediction signals can be avoided. The following elaborates on how this new flag may change operations of video encoder 200 and video decoder 300 with various inter prediction modes when it is enabled:

Regular inter mode: The CABAC engine skips coding/parsing of the bits that represent fractional-precision MVD from AMVR (Adaptive Motion Vector Resolution) syntax. Thus, AMVR supports non-fractional-pel precisions only.

Regular affine mode: The CABAC engine skips coding/parsing the bits that represents fractional-precision MVD from AMVR syntax. Thus, AMVR supports non-fractional-pel precisions only. In addition, in some examples, the derived affine motions can be clipped or rounded (with a predefined offset value) to a non-fractional precision before they are used in motion compensation.

Regular merge mode: Its candidate motions may be clipped or rounded (with a predefined offset value) to a non-fractional precision before they are used in motion compensation.

TPM merge mode: The referenced merge candidates may be clipped or rounded (with a predefined offset value) to a non-fractional precision before they are used to construct the TPM candidate list. In addition, in some examples, the flag that indicated the usage of simplified blending methods can be inferred to be enabled.

MMVD mode: The referenced merge candidates that are used to form the basis vectors of MMVD mode may be clipped or rounded (with a predefined offset value) to a non-fractional precision before they are used. In addition, in some examples, fractional offset values in an MMVD distance table may be disabled.

CIIP mode: The referenced merge candidates may be clipped or rounded (with a predefined offset value) to a non-fractional precision before they are used in motion compensation. In some examples, CIIP mode may be disabled completely in the bitstream when the new flag is enabled.

Additionally, in some examples, adaptive loop filter and deblocking filter may be disabled when the flag indicates that fractional precision motion vectors are disabled.

Figure 7:
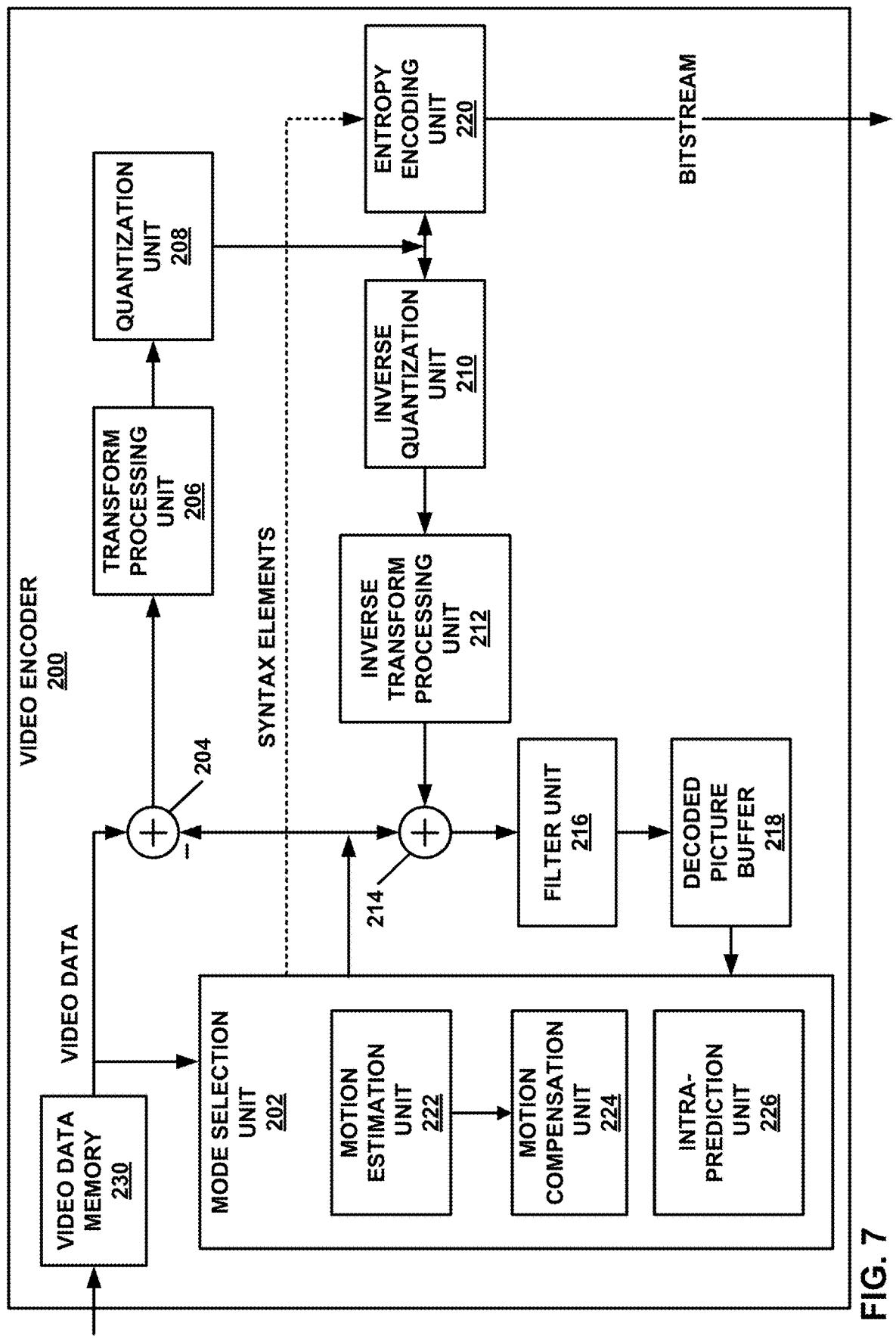
FIG. 7 is a block diagram illustrating an example video encoder that may perform the techniques of this disclosure.

FIG. 7 is a block diagram illustrating an example video encoder 200 that may perform the techniques of this disclosure. FIG. 7 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 7, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 7 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Motion compensation unit 224 may generate the prediction block using a geometric or non-rectangular partition mode, such as triangle partition mode (TPM), according to any of the various techniques of this disclosure as discussed above, alone or in any combination. For example, motion compensation unit 224 may partition a current block into two partitions using a non-rectangular partition mode, each of the partitions having its own respective set of motion information (received from motion estimation unit 222). Motion compensation unit 224 may form a first prediction block for a first partition using a first set of motion information and a second prediction block for a second partition using a second set of motion information. In some examples, motion compensation unit 224 may perform a blending process to blend values of samples along a border between the first and second partitions, e.g., as discussed above with respect to FIGS. 5 and 6. Alternatively, if the current block forms part of a uni-directional inter-prediction slice (that is, a P-slice), motion compensation unit 224 may disable the blending operation as discussed above when generating the prediction block for the current block.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Entropy encoding unit 220 may entropy encode motion information for the current block. For example, if the current block is predicted using a non-rectangular partition mode (e.g., TPM), entropy encoding unit 220 may entropy encode motion information for each resulting partition. In general, entropy encoding unit 220 may entropy encode motion information for an above partition before entropy encoding motion information for a below partition. The above partition may be considered the partition having more samples along an upper edge of the current block, while the below partition may be considered the partition having more samples along a lower edge of the block.

When entropy encoding motion information, the motion information may generally indicate a motion vector (e.g., an X-component and a Y-component), a reference picture list including a reference picture to which the motion vector refers, and a reference picture index identifying the reference picture in the reference picture list. In merge mode, entropy encoding unit 220 may entropy encode a merge index identifying a motion vector predictor candidate (i.e., a merge candidate) in a motion vector predictor candidate list, and use each of the motion vector, the reference picture list, and the reference picture index from the motion vector predictor candidate. In AMVP mode, entropy encoding unit 220 may entropy encode a motion vector predictor candidate, motion vector difference data (e.g., an X-offset and a Y-offset) relative to the motion vector predictor candidate, the reference picture list identifier, and the reference picture index.

In order to entropy encode motion information in this manner, entropy encoding unit 220 may retrieve previously coded motion information candidates stored in, e.g., DPB 218. In accordance with the techniques of this disclosure, when a current block is partitioned using a non-rectangular partition mode, and motion information for both partitions refers to a common reference picture list, video encoder 200 may store the motion information of the second partition in DPB 218 for the current block (without storing the motion information of the first partition). Thus, when coding a subsequent block to the current block, entropy encoding unit 220 may select the motion information of the second partition as a motion vector predictor candidate to predict motion information of the subsequent block.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In this manner, video encoder 200 represents an example of a device for coding video data including a memory configured to store video data; and one or more processors implemented in circuitry and configured to: code a first set of motion information for a current block of the video data, the current block being partitioned into a first partition and a second partition according to a non-rectangular partition mode, the first set of motion information referring to a reference picture list and being associated with the first partition; after coding the first set of motion information, code a second set of motion information for the current block, the second set of motion information referring to the reference picture list and being associated with the second partition; in response to the first set of motion information and the second set of motion information both referring to the reference picture list, store the second set of motion information for the current block in the memory; and predict subsequent motion information of a subsequent block of the video data that neighbors the current block using the stored second set of motion information.

Figure 8:
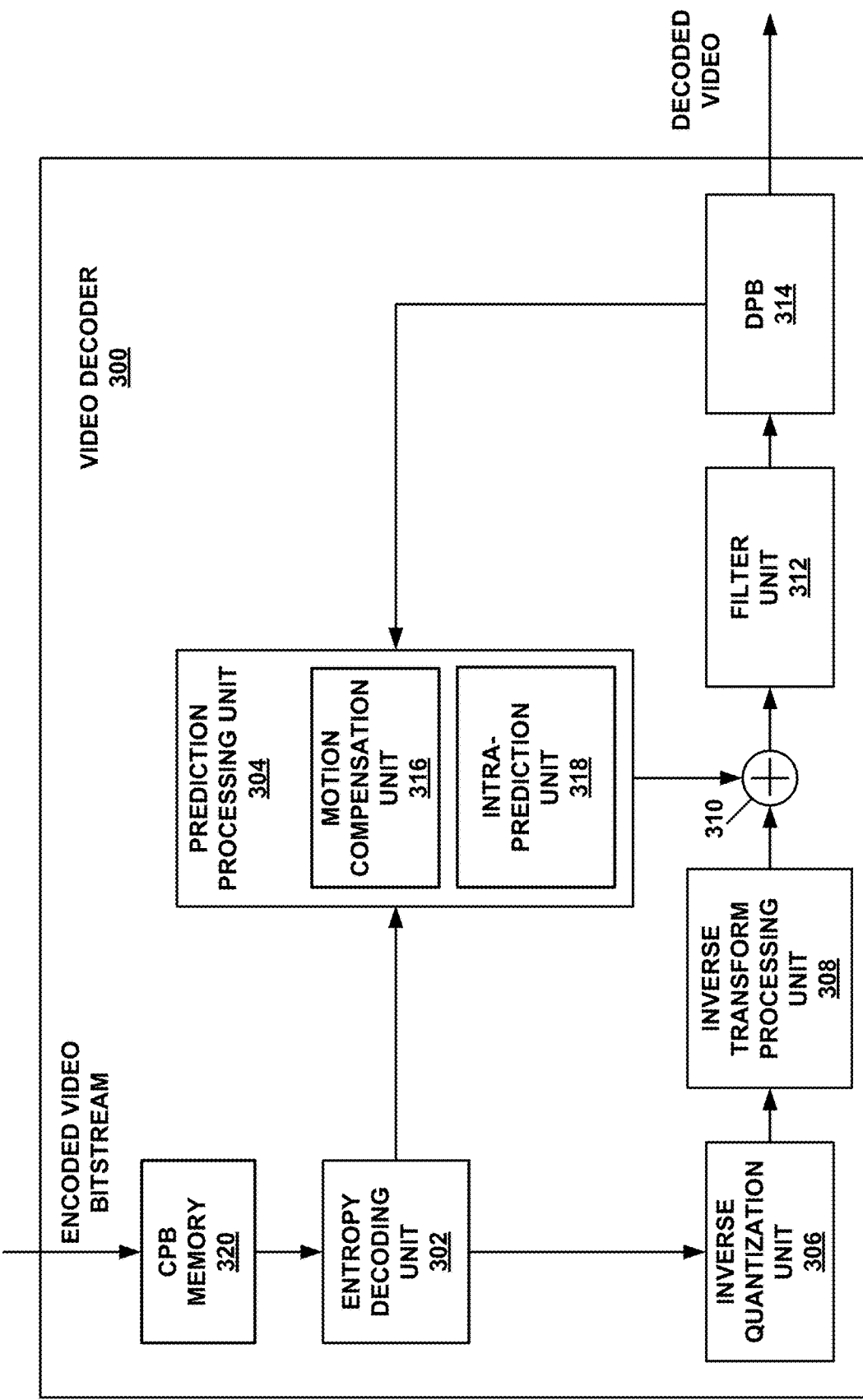
FIG. 8 is a block diagram illustrating an example video decoder that may perform the techniques of this disclosure.

FIG. 8 is a block diagram illustrating an example video decoder 300 that may perform the techniques of this disclosure. FIG. 8 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 8, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with respect to CPB memory 320. Likewise, memory 120 may store instructions to be executed by video decoder 300, when some or all of the functionality of video decoder 300 is implemented in software to be executed by processing circuitry of video decoder 300.

The various units shown in FIG. 8 are illustrated to assist with understanding the operations performed by video decoder 300. The units may be implemented as fixed-function circuits, programmable circuits, or a combination thereof. Similar to FIG. 7, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce data for syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Entropy decoding unit 302 may entropy decode motion information for the current block. For example, if the current block is predicted using a non-rectangular partition mode (e.g., TPM), entropy decoding unit 302 may entropy decode motion information for each resulting partition. In general, entropy decoding unit 302 may entropy decode motion information for an above partition before entropy decoding motion information for a below partition. That is, the bitstream may include the motion information for the above partition before the motion information for the below partition. The above partition may be considered the partition having more samples along an upper edge of the current block, while the below partition may be considered the partition having more samples along a lower edge of the block.

When entropy decoding motion information, the motion information may generally indicate a motion vector (e.g., an X-component and a Y-component), a reference picture list including a reference picture to which the motion vector refers, and a reference picture index identifying the reference picture in the reference picture list. In merge mode, entropy decoding unit 302 may entropy decode a merge index identifying a motion vector predictor candidate (i.e., a merge candidate) in a motion vector predictor candidate list, and use each of the motion vector, the reference picture list, and the reference picture index from the motion vector predictor candidate. In AMVP mode, entropy decoding unit 302 may entropy decode a motion vector predictor candidate, motion vector difference data (e.g., an X-offset and a Y-offset) relative to the motion vector predictor candidate, the reference picture list identifier, and the reference picture index.

In order to entropy decode motion information in this manner, entropy decoding unit 302 may retrieve previously decoded motion information candidates stored in, e.g., DPB 314. In accordance with the techniques of this disclosure, when a current block is partitioned using a non-rectangular partition mode, and motion information for both partitions refers to a common reference picture list, video decoder 300 may store the motion information of the second partition in DPB 314 for the current block (without storing the motion information of the first partition). Thus, when coding a subsequent block to the current block, entropy decoding unit 302 may select the motion information of the second partition as a motion vector predictor candidate to predict motion information of the subsequent block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture.

Motion compensation unit 316 may generally perform the inter-prediction process in a manner that is substantially similar to that described with respect to motion compensation unit 224 (FIG. 7). Motion compensation unit 316 may generate the prediction block using a non-rectangular (e.g., geometric) partition mode, such as triangle partition mode (TPM), according to any of the various techniques of this disclosure as discussed above, alone or in any combination. In some examples, motion compensation unit 316 may perform a blending operation to smooth values of samples along the partition boundary of the two partitions, e.g., as explained above with respect to FIGS. 5 and 6. Alternatively, if the current block forms part of a uni-directional inter-prediction slice (that is, a P-slice), motion compensation unit 316 may disable the blending operation as discussed above when generating the prediction block for the current block.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 7). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a device for coding video data including a memory configured to store video data; and one or more processors implemented in circuitry and configured to: code a first set of motion information for a current block of the video data, the current block being partitioned into a first partition and a second partition according to a non-rectangular partition mode, the first set of motion information referring to a reference picture list and being associated with the first partition; after coding the first set of motion information, code a second set of motion information for the current block, the second set of motion information referring to the reference picture list and being associated with the second partition; in response to the first set of motion information and the second set of motion information both referring to the reference picture list, store the second set of motion information for the current block in the memory; and predict subsequent motion information of a subsequent block of the video data that neighbors the current block using the stored second set of motion information.

Figure 9:
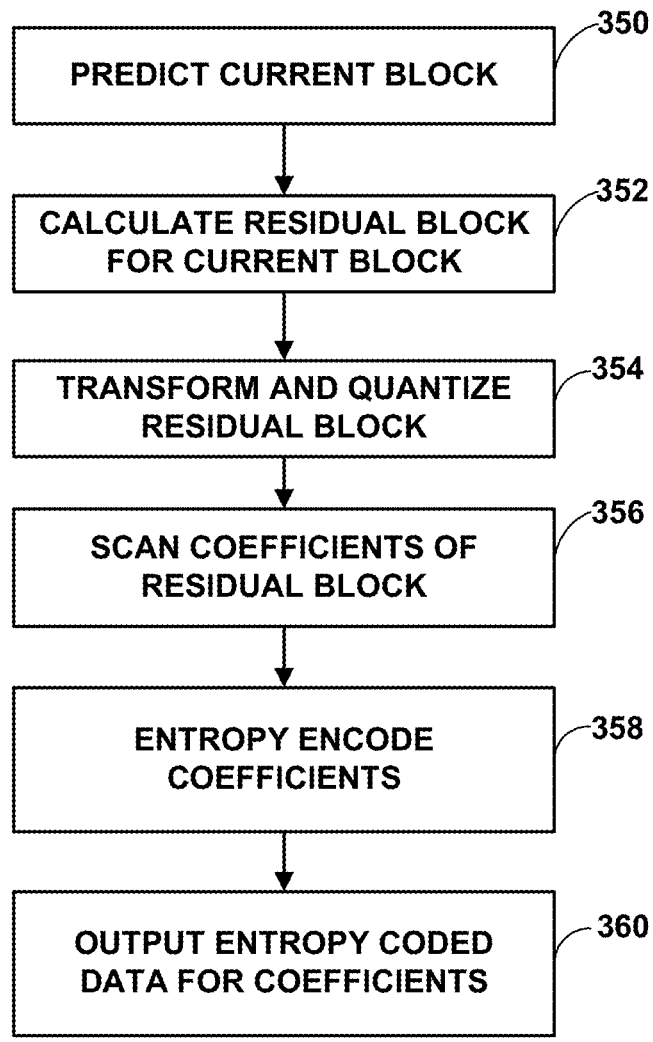
FIG. 9 is a flowchart illustrating an example method for encoding a current block in accordance with the techniques of this disclosure.

FIG. 9 is a flowchart illustrating an example method for encoding a current block in accordance with the techniques of this disclosure. The current block may comprise a current CU. Although described with respect to video encoder 200 (FIGS. 1 and 7), it should be understood that other devices may be configured to perform a method similar to that of FIG. 9.

In this example, video encoder 200 initially predicts the current block (350). For example, video encoder 200 may form a prediction block for the current block. Video encoder 200 may form the prediction block using a non-rectangular partition mode, e.g., triangle partition mode (TPM), according to any of the various techniques of this disclosure. Additionally, if the current block forms part of a uni-directional inter-prediction slice (that is, a P-slice), video encoder 200 may further disable a blending operation as discussed above when generating the prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

In this manner, the method of FIG. 9 represents an example of a method of coding video data including coding a first set of motion information for a current block of video data, the current block being partitioned into a first partition and a second partition according to a non-rectangular partition mode, the first set of motion information referring to a reference picture list and being associated with the first partition; after coding the first set of motion information, coding a second set of motion information for the current block, the second set of motion information referring to the reference picture list and being associated with the second partition; in response to the first set of motion information and the second set of motion information both referring to the reference picture list, storing the second set of motion information for the current block; and predicting subsequent motion information of a subsequent block of the video data that neighbors the current block using the stored second set of motion information.

Figure 10:
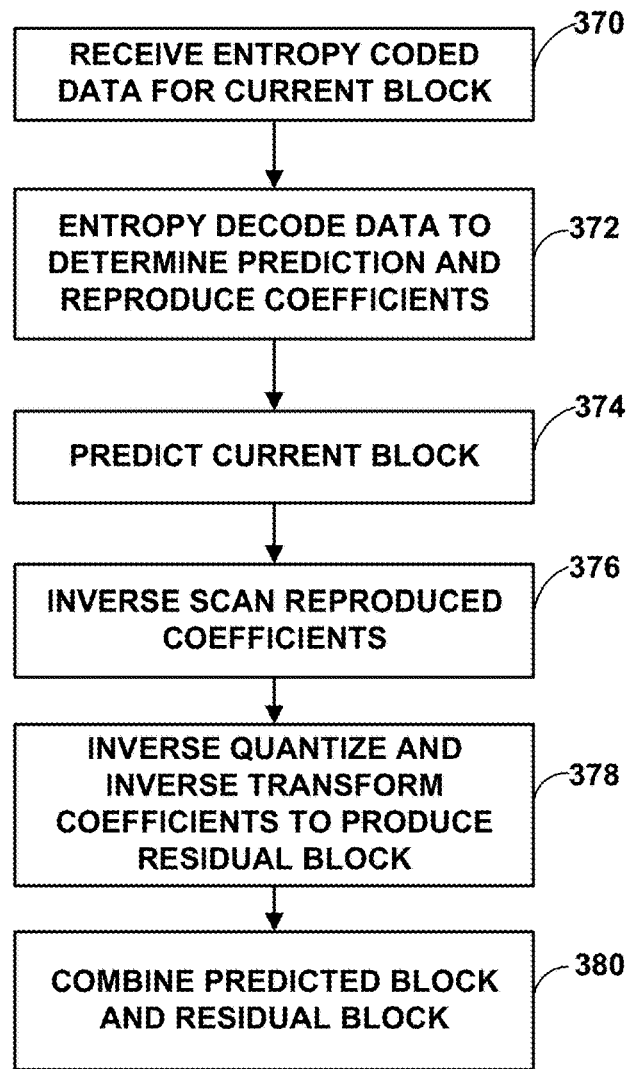
FIG. 10 is a flowchart illustrating an example method for decoding a current block in accordance with the techniques of this disclosure.

FIG. 10 is a flowchart illustrating an example method for decoding a current block in accordance with the techniques of this disclosure. The current block may comprise a current CU. Although described with respect to video decoder 300 (FIGS. 1 and 8), it should be understood that other devices may be configured to perform a method similar to that of FIG. 10.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may form the prediction block using, e.g., a non-rectangular partition mode, such as triangle partition mode (TPM), according to any of the various techniques of this disclosure. Additionally, if the current block forms part of a uni-directional inter-prediction slice (that is, a P-slice), video decoder 300 may further disable a blending operation as discussed above when generating the prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

In this manner, the method of FIG. 10 represents an example of a method of coding video data including coding a first set of motion information for a current block of video data, the current block being partitioned into a first partition and a second partition according to a non-rectangular partition mode, the first set of motion information referring to a reference picture list and being associated with the first partition; after coding the first set of motion information, coding a second set of motion information for the current block, the second set of motion information referring to the reference picture list and being associated with the second partition; in response to the first set of motion information and the second set of motion information both referring to the reference picture list, storing the second set of motion information for the current block; and predicting subsequent motion information of a subsequent block of the video data that neighbors the current block using the stored second set of motion information.

Figure 11:
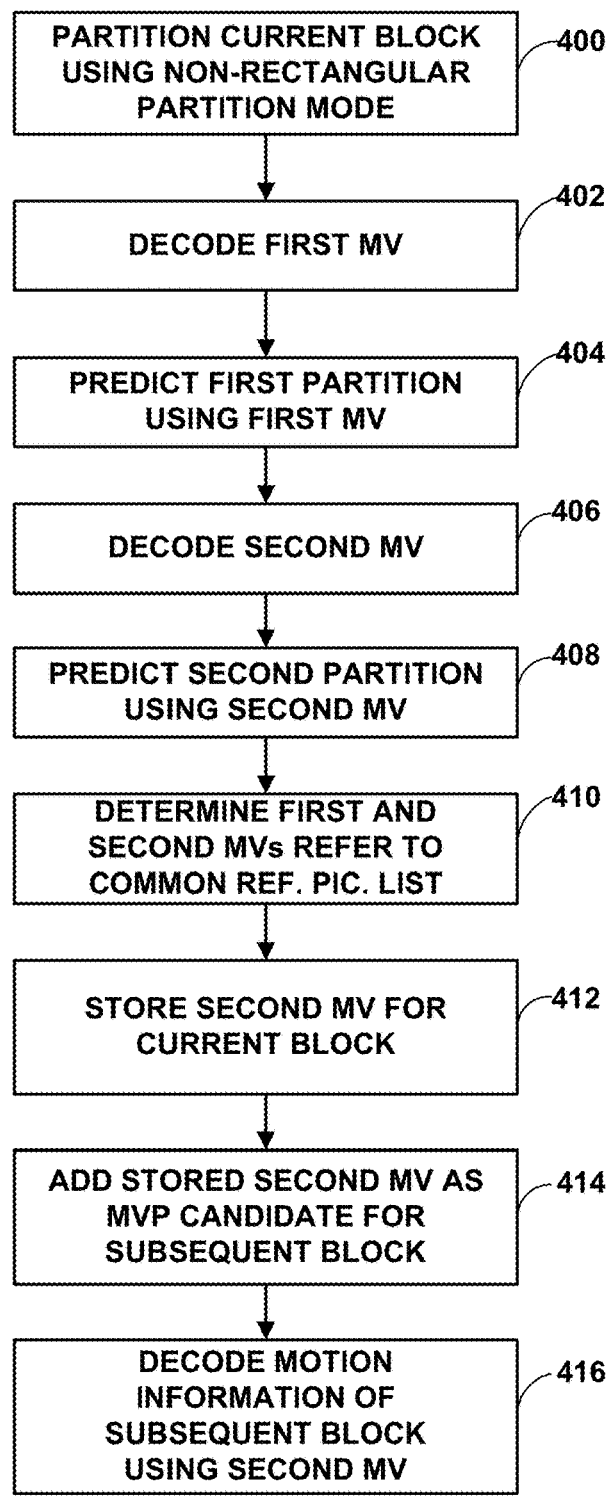
FIG. 11 is a flowchart illustrating an example method of decoding video data according to the techniques of this disclosure.

FIG. 11 is a flowchart illustrating an example method of decoding video data according to the techniques of this disclosure. For purposes of example, the method of FIG. 11 is explained with respect to video decoder 300 of FIGS. 1 and 8. Video encoder 200 may perform a substantially similar method for encoding video data, as explained below.

Initially, video decoder 300 partitions a current block using a non-rectangular partition mode (400), e.g., TPM. Video decoder 300 may also decode a first motion vector (MV) (402) for a first partition of the current block. In particular, a video bitstream including the current block may include a first set of motion information and a second set of motion information, where the first set of motion information is present in the bitstream before the second set of motion information. Thus, video decoder 300 may parse the bitstream and obtain the first set of motion information before the second set of motion information. Due to encountering the first set of motion information before the second set of motion information, video decoder 300 may determine that the first set of motion information corresponds to an above partition of the current block (i.e., a partition having more samples along an upper boundary of the current block). The above partition is also referred to below as a "first partition."

To decode the first set of motion information, video decoder 300 may construct a motion vector predictor candidate list, e.g., according to merge mode or AMVP mode. The first set of motion information may include a candidate index identifying a candidate in the motion vector predictor candidate list. If the first set of motion information is encoded in merge mode, video decoder 300 may determine a motion vector, reference picture list, and reference picture index for the first set of motion information from the motion vector predictor candidate identified by the candidate index. If the first set of motion information is encoded in AMVP mode, video decoder 300 may decode motion vector difference values, the reference picture list identifier, and the reference picture index from data of the bitstream, and reconstruct the motion vector by adding the motion vector difference values to the components of the motion vector of the motion vector predictor candidate identified by the candidate index. Video decoder 300 may then predict the first partition of the current block using the first set of motion information, including the first motion vector (404).

Video decoder 300 may also decode a second motion vector for the current block (406), corresponding to the second partition. Video decoder 300 may decode the second motion vector by decoding a second set of motion information as discussed above with respect to the first set of motion information. Video decoder 300 may then use the second motion vector to predict a second partition of the current block (408), where the second partition corresponds to a below partition (i.e., a partition having more samples along a lower boundary of the current block).

In this example, video decoder 300 determines that the first and second motion vectors refer to a common reference picture list (410). That is, video decoder 300, in this example, determines that the reference picture list identifier of the first set of motion information and the reference picture list identifier of the second set of motion information correspond to the same reference picture list. The reference picture list may be, for example, RefPicList0 or RefPicList1. In response to determining that both partitions of the current block (predicted using the non-rectangular partition mode) are predicted using the same reference picture list (i.e., that the first and second sets of motion information each include the same reference picture list identifier), video decoder 300 stores the second MV for the current block (412), e.g., in DPB 314. Video decoder 300 may store the second MV for all sub-blocks of the current block, and not store the first MV for the current block, for use as a subsequent motion vector predictor candidate. Although not described in FIG. 11, video decoder 300 may proceed to decode the current block using the first and second predicted partitions, e.g., as discussed above with respect to FIG. 10.

Accordingly, when decoding a subsequent block (e.g., a spatially neighboring block), video decoder 300 may add the stored second MV as a motion vector predictor (MVP) candidate for the subsequent block (414). For example, the "current block" referred to above may correspond to NB 152A of FIG. 4, and the "subsequent block" may correspond to current block 150 of FIG. 4, in which case NB 152A neighbors current block 150. Therefore, video decoder 300 may use motion information of NB 152A as a motion vector predictor candidate to be added to a motion vector prediction candidate list for current block 150.

Video decoder 300 may then decode motion information of the subsequent block using the second motion vector (416). For example, again with respect to FIG. 4, video decoder 300 may construct a motion vector predictor candidate list including motion information of NBs 152 and TNB 154A or TNB 154B. Video decoder 300 may further decode a motion vector predictor candidate index, identifying one of NBs 152 or TNB 154A or TNB 154B as the motion vector predictor candidate for current block 150. Assuming once again that the "current block" referred to above corresponds to NB 152A, the "subsequent block" referred to above corresponds to current block 150, and that the candidate index identifies NB 152A, video decoder 300 may use the motion information (including the motion vector) for NB 152A to decode the motion information for current block 150. For example, in merge mode, video decoder 300 may use the motion vector of NB 152A (i.e., the stored second motion vector of the "current block" referred to above) as a motion vector for current block 150, whereas in AMVP mode, video decoder 300 may use the motion vector of NB 152A as a motion vector predictor, and decode motion vector difference values representing offsets to be applied to components of the motion vector predictor to form the motion vector for current block 150.

In this manner, the method of FIG. 11 represents an example of a method of coding video data including coding a first set of motion information for a current block of video data, the current block being partitioned into a first partition and a second partition according to a non-rectangular partition mode, the first set of motion information referring to a reference picture list and being associated with the first partition; after coding the first set of motion information, coding a second set of motion information for the current block, the second set of motion information referring to the reference picture list and being associated with the second partition; in response to the first set of motion information and the second set of motion information both referring to the reference picture list, storing the second set of motion information for the current block; and predicting subsequent motion information of a subsequent block of the video data that neighbors the current block using the stored second set of motion information.

As noted above, video encoder 200 may be configured to perform a substantially similar method to that of FIG. 11. In the similar method, video encoder 200 may encode the first and second motion vectors after using the motion vectors to predict the first and second partitions, and video encoder 200 may use the second motion vector to encode motion information of the subsequent block, e.g., in merge mode or AMVP mode.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
coding a first set of motion information for a current block of video data, the current block being partitioned into a first partition and a second partition according to a non-rectangular partition mode, the first set of motion information referring to a reference picture list and being associated with the first partition;
after coding the first set of motion information, coding a second set of motion information for the current block, the second set of motion information referring to the reference picture list and being associated with the second partition, the second set of motion information being different than the first set of motion information;
generating a prediction block for the current block of video data using the first set of motion information and the second set of motion information;
coding the current block of video data using the prediction block;
in response to the first set of motion information and the second set of motion information both referring to the reference picture list, storing the second set of motion information for the current block, without storing the first set of motion information for the current block for subsequent use in predicting motion information; and
predicting subsequent motion information of a subsequent block of the video data that neighbors the current block using the stored second set of motion information.

2. The method of claim 1, wherein storing the second motion vector comprises storing the second motion vector for all sub-blocks of the current block.

3. The method of claim 1, further comprising determining that a size of the current block satisfies a threshold, wherein storing the second motion vector comprises storing the second motion vector in response to determining that the size of the current block satisfies the threshold.

4. The method of claim 3, wherein the threshold comprises 4×N or N×4, N being a positive integer value.

5. The method of claim 1, wherein predicting the subsequent motion information of the subsequent block comprises:
forming a motion prediction candidate list for the subsequent block, comprising adding the second motion vector to the motion prediction candidate list;
selecting the second motion vector from the motion prediction candidate list; and
predicting the subsequent motion information of the subsequent block using the second motion vector.

6. The method of claim 1, wherein the current block forms part of a uni-directional inter-prediction slice (P-slice), the method further comprising disabling a blending operation for the current block.

7. The method of claim 1, wherein the first partition comprises a first triangle partition, the second partition comprises a second triangle partition, and the non-rectangular partition mode comprises triangle partition mode (TPM).

8. The method of claim 1, wherein generating the prediction block for the current block using the first set of motion information and the second set of motion information comprises generating the prediction block for the current block using the first set of motion information and the second set of motion information without performing a blending operation between the first partition and the second partition.

9. The method of claim 1, wherein generating the prediction block comprises:
resetting blending weights larger than 4/8 equal to 8x8;
resetting blending weights smaller than 4/8 equal to 0x8; and
combining the first partition and the second partition using the reset blending weights.

10. The method of claim 9, further comprising resetting blending weights that are equal to 4/8 to instead be equal to 8/8.

11. The method of claim 9, further comprising resetting blending weights that are equal to 4/8 to instead be equal to 0/8.

12. The method of claim 9, further comprising resetting blending weights that are equal to 4/8 to instead be equal to 0/8 or 8/8 according to a split direction for the current block.

13. The method of claim 8, wherein generating the prediction block comprises generating the prediction block using regular inter-prediction, the method further comprising skipping context-adaptive binary arithmetic coding (CABAC) of bits representing fractional-precision motion vector difference (MVD) values for adaptive motion vector resolution (AMVR) syntax elements.

14. The method of claim 8, wherein generating the prediction block comprises generating the prediction block using affine prediction mode, the method further comprising skipping context-adaptive binary arithmetic coding (CABAC) of bits representing fractional-precision motion vector difference (MVD) values for adaptive motion vector resolution (AMVR) syntax elements.

15. The method of claim 1, wherein coding the current block of video data using the prediction block comprises decoding the current block of video data using the prediction block, including:
inverse quantizing and inverse transforming a quantized transform block to generate a residual block for the current block; and
combining samples of the residual block with samples of the prediction block to decode the current block.

16. The method of claim 1, wherein coding the current block of video data using the prediction block comprises encoding the current block of video data using the prediction block, including:
subtracting samples of the prediction block from samples of the current block to generate a residual block for the current block; and
transforming and quantizing the residual block to encode the current block.

17. A device for coding video data, the device comprising:
a memory configured to store video data; and
one or more processors implemented in circuitry and configured to:
code a first set of motion information for a current block of the video data, the current block being partitioned into a first partition and a second partition according to a non-rectangular partition mode, the first set of motion information referring to a reference picture list and being associated with the first partition;

after coding the first set of motion information, code a second set of motion information for the current block, the second set of motion information referring to the reference picture list and being associated with the second partition, the second set of motion information being different than the first set of motion information;

generate a prediction block for the current block of video data using the first set of motion information and the second set of motion information;

code the current block of video data using the prediction block;

in response to the first set of motion information and the second set of motion information both referring to the reference picture list, store the second set of motion information for the current block in the memory, without storing the first set of motion information for the current block for subsequent use in predicting motion information; and predict subsequent motion information of a subsequent block of the video data that neighbors the current block using the stored second set of motion information.

18. The device of claim 17, wherein the one or more processors are configured to store the second motion vector for all sub-blocks of the current block.

19. The device of claim 17, wherein the one or more processors are configured to determine that a size of the current block satisfies a threshold, and to store the second motion vector in response to determining that the size of the current block satisfies the threshold.

20. The device of claim 17, wherein to predict the subsequent motion information of the subsequent block, the one or more processors are configured to:

form a motion prediction candidate list for the subsequent block and add the second motion vector to the motion prediction candidate list;

select the second motion vector from the motion prediction candidate list; and predict the subsequent motion information of the subsequent block using the second motion vector.

21. The device of claim 17, wherein the one or more processors are further configured to generate a prediction block for the current block using the first set of motion information and the second set of motion information and without performing a blending operation between the first partition and the second partition.

22. The device of claim 17, wherein to code the current block of video data, the one or more processors are configured to decode the current block of video data, and wherein to decode the current block of video data, the one or more processors are configured to:

inverse quantize and inverse transform a quantized transform block to generate a residual block for the current block; and combine samples of the residual block with samples of the prediction block to decode the current block.

23. The device of claim 17, wherein to code the current block of video data, the one or more processors are configured to encode the current block of video data, and wherein to encode the current block of video data, the one or more processors are configured to:

subtract samples of the prediction block from samples of the current block to generate a residual block for the current block; and transform and quantize the residual block to encode the current block.

24. The device of claim 17, further comprising a display configured to display decoded video data.

25. The device of claim 17, wherein the device comprises one or more of a camera, a computer, a mobile device, a broadcast receiver device, or a set-top box.

26. The device of claim 17, wherein the device comprises at least one of:

an integrated circuit;

a microprocessor; or a wireless communication device.

27. A non-transitory computer-readable storage medium having stored thereon instructions that, when executed, cause a processor to:

code a first set of motion information for a current block of video data, the current block being partitioned into a first partition and a second partition according to a non-rectangular partition mode, the first set of motion information referring to a reference picture list and being associated with the first partition;

after coding the first set of motion information, code a second set of motion information for the current block, the second set of motion information referring to the reference picture list and being associated with the second partition, the second set of motion information being different than the first set of motion information;

generate a prediction block for the current block of video data using the first set of motion information and the second set of motion information;

code the current block of video data using the prediction block;

in response to the first set of motion information and the second set of motion information both referring to the reference picture list, store the second set of motion information for the current block, without storing the first set of motion information for the current block for subsequent use in predicting motion information; and predict subsequent motion information of a subsequent block of the video data that neighbors the current block using the stored second set of motion information.

28. The non-transitory computer-readable storage medium of claim 27, wherein the instructions that cause the processor to store the second motion vector comprise instructions that cause the processor to store the second motion vector for all sub-blocks of the current block.

29. The non-transitory computer-readable storage medium of claim 27, further comprising instructions that cause the processor to determine that a size of the current block satisfies a threshold, wherein the instructions that cause the processor to store the second motion vector comprise instructions that cause the processor to store the second motion vector in response to determining that the size of the current block satisfies the threshold.

30. The non-transitory computer-readable storage medium of claim 27, wherein the instructions that cause the processor to predict the subsequent motion information of the subsequent block comprise instructions that cause the processor to:

form a motion prediction candidate list for the subsequent block and add the second motion vector to the motion prediction candidate list;

select the second motion vector from the motion prediction candidate list; and predict the subsequent motion information of the subsequent block using the second motion vector.

31. The non-transitory computer-readable storage medium of claim 27, further comprising instructions that cause the processor to generate a prediction block for the current block using the first set of motion information and the second set of motion information and without performing a blending operation between the first partition and the second partition.

32. The non-transitory computer-readable storage medium of claim 27, wherein the instructions that cause the processor to code the current block of video data comprise instructions that cause the processor to decode the current block of video data, including instructions that cause the processor to:
  inverse quantize and inverse transform a quantized transform block to generate a residual block for the current block; and
  combine samples of the residual block with samples of the prediction block to decode the current block.

33. The non-transitory computer-readable storage medium of claim 27, wherein the instructions that cause the processor to code the current block of video data comprise instructions that cause the processor to encode the current block of video data, including instructions that cause the processor to:
  subtract samples of the prediction block from samples of the current block to generate a residual block for the current block; and
  transform and quantize the residual block to encode the current block.

34. A device for coding video data, the device comprising:
  means for coding a first set of motion information for a current block of video data, the current block being partitioned into a first partition and a second partition according to a non-rectangular partition mode, the first set of motion information referring to a reference picture list and being associated with the first partition;
  means for coding a second set of motion information for the current block after coding the first set of motion information, the second set of motion information referring to the reference picture list and being associated with the second partition, the second set of motion information being different than the first set of motion information;
  means for generating a prediction block for the current block of video data using the first set of motion information and the second set of motion information;
  means for coding the current block of video data using the prediction block;
  means for storing the second set of motion information for the current block in response to the first set of motion information and the second set of motion information both referring to the reference picture list, without storing the first set of motion information for the current block for subsequent use in predicting motion information; and
  means for predicting subsequent motion information of a subsequent block of the video data that neighbors the current block using the stored second set of motion information.

35. The device of claim 34, wherein the means for predicting the subsequent motion information of the subsequent block comprises:
  means for forming a motion prediction candidate list for the subsequent block, comprising means for adding the second motion vector to the motion prediction candidate list;
  means for selecting the second motion vector from the motion prediction candidate list; and
  means for predicting the subsequent motion information of the subsequent block using the second motion vector.

36. The device of claim 34, wherein the means for coding the current block of video data comprise means for decoding the current block of video data, including:
  means for inverse quantizing and inverse transforming a quantized transform block to generate a residual block for the current block; and
  means for combining samples of the residual block with samples of the prediction block to decode the current block.

37. The device of claim 34, wherein the means for coding the current block of video data comprise means for decoding the current block of video data, including:
  means for subtracting samples of the prediction block from samples of the current block to generate a residual block for the current block; and
  means for transforming and quantizing the residual block to encode the current block.

* * * * *